W. S. HUTCHINSON.
STORAGE BATTERY PLATE.
APPLICATION FILED JULY 16, 1913.
1,228,675.
Patented June 5, 1917.
2 SHEETS—SHEET 1.
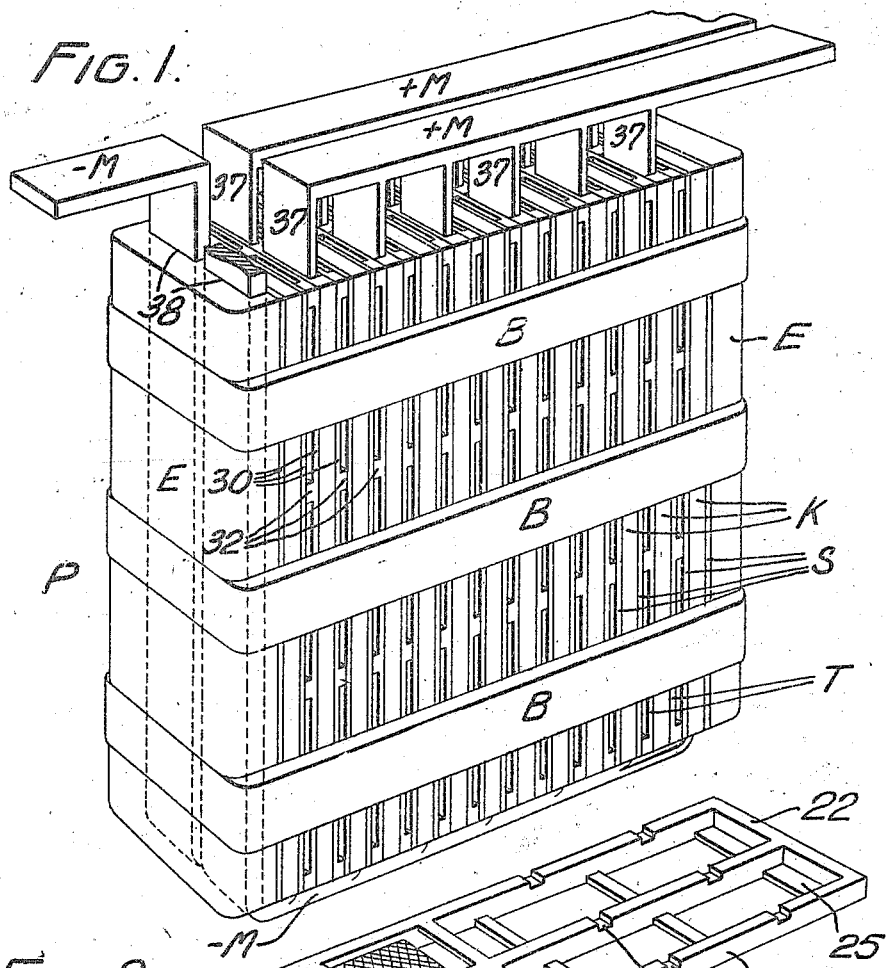
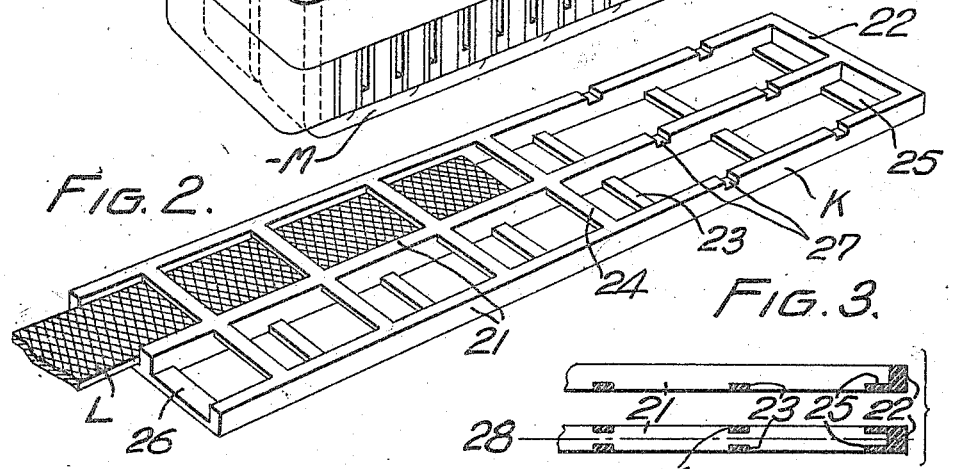
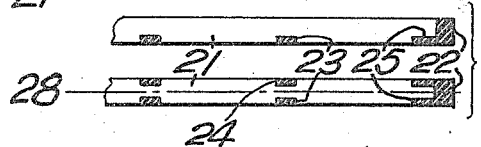
Witnesses
Stuart R. W. Allen
G. M. Moreland
Inventor
W. S. Hutchinson
By
Fred B. Fetherstonhaugh
His Attorney W. S. HUTCHINSON.
STORAGE BATTERY PLATE.
APPLICATION FILED JULY 16, 1913.
1,228,675.
Patented June 5, 1917.
2 SHEETS—SHEET 2.
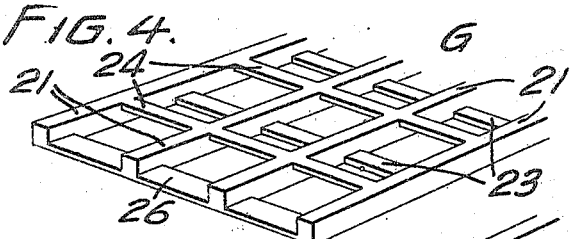
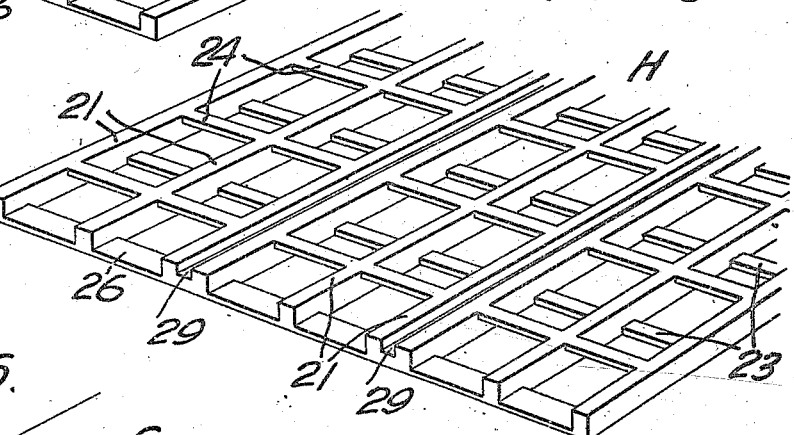
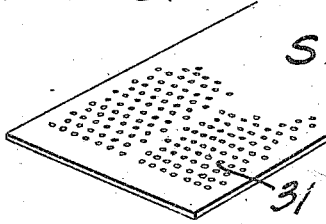
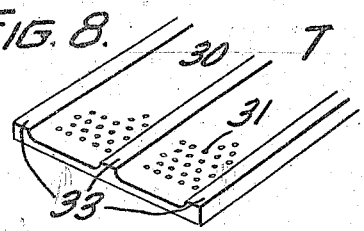
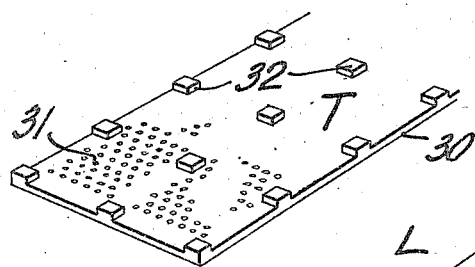
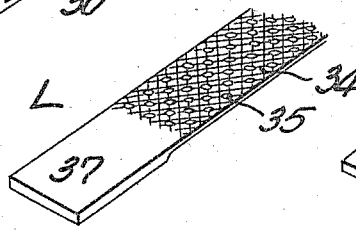
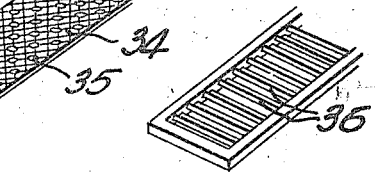
Witnesses
Inventor
W. S. Hutchinson
By Fred B. Fetherstonhaugh
His Attorney

UNITED STATES PATENT OFFICE.

WILLIAM SCOTT HUTCHINSON, OF MONTREAL, QUEBEC, CANADA.

STORAGE-BATTERY PLATE.

1,228,675.

Specification of Letters Patent.

Patented June 5, 1917.

Application filed July 16, 1913. Serial No. 779,373.

*To all whom it may concern:*

Be it known that I, WILLIAM SCOTT HUTCHINSON, a subject of the King of Great Britain, and resident of the city of Montreal, in the Province of Quebec and Dominion of Canada, have invented certain new and useful Improvements in Storage-Battery Plates, of which the following is a full, clear, and exact description.

This invention relates to improvements in storage battery plates, and the main object of the invention is to provide a plate of bifunctional character which may be manufactured at greatly reduced cost, both as regards material and labor in assembling.

A further object is to provide a battery plate of great durability and long life so constructed that the battery will be free from sedimentation and sulfation.

In the manufacture of batteries of the lead-lead type, the usual practice is to arrange lead strips pasted with active material, with insulating separators in piles, each pile forming a single plate and containing only a single row of lead strips. In order to prevent the buckling of the lead strips, the same have been mounted in holders of different kinds in addition to the separators. In this invention, the holders or frames are so formed as to hold a plurality of lead strips arranged edge to edge, so that the number of movements required to assemble the frames and strips and to paste on the active material is greatly reduced, thus reducing the cost of manufacture. At the same time, the amount of material required for the frames is slightly reduced, and a more compact battery is produced requiring a smaller and therefore less expensive jar. The battery plates formed by this means are of compound type, each plate being the equivalent of two or more ordinary plates. If, however, plates of usual size are desired, the parts may be assembled according to this invention and the compound plate formed cut into a plurality of thin plates of the usual size.

In the drawings which illustrate the invention:—

Figure 1 is a perspective view of a battery plate complete formed according to the present invention.

Figs. 2, 4 and 5 are perspective views showing frames adapted to contain respectively two, three and six lead strips.

Fig. 3 is a fragmentary sectional view showing alternative methods of making the frames.

Figs. 6, 7 and 8 are fragmentary perspective views showing various forms of separators.

Fig. 9 is a fragmentary perspective view of one form of lead strip.

Fig. 10 is a fragmentary perspective view of a grid which may be used in place of the lead strip.

Referring more particularly to the drawings, P designates a compound battery plate complete formed according to the present invention and built up of a plurality of frames K spaced apart by separators S and T, arranged in pairs. At each end of the plate is a heavy rigid bar or binder E over which straps B pass and secure the various parts together. The various lead strips of the plate are connected to bus bars designated +M and —M.

The frames K each comprise a plurality of longitudinal members, designated 21, arranged parallelly and connected at one end by a transverse bar 22 of substantially the same size as themselves. Throughout the length of this frame, members 21 are connected by thin transverse bars 23 and 24 arranged alternately on opposite sides of the frame, as clearly shown in Fig. 2, so that clear and unobstructed channels will be left from end to end of the frame, as plainly shown in Fig. 3. One of these rows of bars, for instance the bars 23, may have at one end of the frame a bar 25 very close to or integral with the end 22, while at the opposite end the bar 26 will connect the extremities of the longitudinal members. These bars may be arranged in staggered relation, as shown in Fig. 2, in a single row, as shown in the upper part of Fig. 3, or in two rows as shown in the lower part of Fig. 3, with the bars opposite. The arrangement of these bars is not of vital importance and depends more upon the ease of manufacture than anything else. For instance, the frame may be cast or die-pressed with the bars 23 on one side integral with the longitudinal members, and with notches 27 formed in the opposite side of the bars for the reception of the bars 24, which may be pressed and cemented into place. Another method of making the frame would be to press the same in two parts which would be connected along the dot and dash line, designated 28, in the lower part of Fig. 3.

The frame shown in Fig. 2 is adapted to contain two lead strips. In Fig. 4, a frame G is shown similar to the frame K, but adapted to contain three strips. The structure of this frame may partake of any of the forms already described. In Fig. 5, a frame H is shown having the capacity of six strips. This frame as will be readily seen consists really of three frames K, formed integral but separated by grooves 29 which form circulation passages for the electrolyte. This frame H could obviously be constructed of two of the frames G separated by a single groove 29. It will be understood that the frames may be made any size desired, so as to contain any number of lead strips, suitable provision such as the slots 29 being made for the circulation of the electrolyte, and to provide for the ventilation of the plate and escape of any gases formed.

These plates, whatever their capacity may be, are spaced apart by separators arranged in pairs. The separator S consists merely of a thin plate 30 of suitable size provided with a multitude of small apertures 31 arranged in elongated groups, adapted to register with the lead strip spaces of the frame. The frame T is similar to the frame S, but is provided in addition with a plurality of small lugs 32 arranged to register with the longitudinal members of the frames. In the form shown in Fig. 8, the separator instead of being provided with lugs 32 is provided with a plurality of longitudinal ribs or corrugations 33. This form is particularly adaptable for wood separators owing to the fact that the small lugs 32 would soon break off from the separator. The lead strip L shown in Fig. 9 exhibits a number of formations which may be applied either singly or in any desired combination, or the strip formed with perfectly plain, smooth surfaces. However, it is preferred to break the surface of the strip in some way so that it will more readily hold the active material. This breaking of the surface may be accomplished by milling or knurling the surface, as shown at 34, by punching out apertures 35 or by displacing the metal, so that in place of an aperture entirely through the strip a recess will be formed on one side and a projection on the opposite side. Various other means may be obviously employed to attain the same result without in any way departing from the spirit of the invention. It may also be preferable to substitute for the lead strip a grid of any suitable form, of which one example is shown in Fig. 10. This grid will be constructed of metal, preferably lead, and will hold between the bars 36 thereof the active material applied either in the form of a paste or of separate previously formed blocks held in position by the bars.

The method of assembling the plate is very simple. The lead strips or grids, according to which are used, are slipped into the frames which are formed of any suitable insulating material such as vulcanite, or may even be formed of metal covered with insulating material. The strips each occupy the space between adjacent longitudinal members of the frame, and are held parallel with the frame by the cross bars 23 and 24. In this way, pockets are formed on each side of the frame equal in depth to the thickness of the cross bars. The active material is then applied to the lead strip, preferably in the form of a paste, and in quantity sufficient to fill the pockets level full. The lead strips it will be noted are longer than the frames, so that the end of each strip projects beyond the open end of the frame, that is past the bar 26. These lead strip ends, which are designated 37, are preferably slightly thicker than the bodies of the strips. The pasted frame is now inclosed between two separators, for example two separators S. The next frame to be placed in the plate is inclosed between two separators T, which are arranged with their lugs 32 turned outwardly. The next frame is arranged between two plain separators S. It will thus be seen that the separators of adjacent plates are spaced apart by the lugs of the separators D, so that passages are formed for the free circulation of the electrolyte and the escape of gases. In arranging the frames, the closed ends are placed alternately at the top and bottom of the plate, so that the ends 37 of every second strip project at the top of the plate, while the ends of intermediate strips project at the bottom of the plate. Thus, in making up the plate, the frames inclosed between plain separators may be considered as negatives, and those between lugged separators as positives, so that the parts may be assembled with the greatest ease, negative and positive alternately. The upwardly projecting ends 37 are connected to the positive bus bars +M, while the downwardly projecting ends of alternate strips are connected to the negative bus bars —M. In order to bring the negative bus bars to the top of the plate, one of the end bars E is provided with grooves 38, in which the negative bus bars extend from the bottom to the top complete, as shown in dotted lines, Fig. 1. In making up the plate, the use of the compound frames shown obviously decreases the amount of work. For instance, a six strip frame may be picked up and the strips inserted with seven movements, whereas with single strip frames, twelve movements would be required, thus showing a saving of approximately 40%. The same saving applies to the pasting on of the active material and to the assembling of frames and separators into the completed plate, the economy being in some instances almost 80%. It would be possible in connecting the strips to the bus bars to connect all the strips to a single broad bus bar, but it is preferred to use a separate bus bar for each row of strips, as shown in Fig. 2, and connect the ends of these bus bars M into a common bus main, not shown in the drawings. This arrangement concentrates the full lines of current, as is well understood, and enables a uniform distribution during both charging and discharging. Of course, it would be possible and practical in the case of a plate having three or more rows of strips to connect the strips of each row across the plate, and then to connect these cross connecters into a single bus bar located parallel with the strip rows.

From the foregoing description, it will be seen that a battery for the plates constructed according to this invention may be built for comparatively small cost, and will in addition have a maximum of efficiency, as the active material is thinly distributed over a very large area, so that action takes place all through the material and not merely on the surface. The use of perforated separators of insulating material in direct contact with the active material of the electrodes, prevents the loss of this material through disintegration into small particles, which separate from the main body and fall to the bottom of the battery jar, producing what is commonly termed sediment. The spacing apart of these separators permits free circulation of the electrolyte in any direction and easy contact with the active material, not only opposite the apertures of the separators but on the entire surface of the material. This latter condition is due to the fact that there is little or no adhesion between the insulating separators and the active material, so that the electrolyte entering through the apertures of the separators circulates behind them. This spacing apart of the separators also provides upright passages or flues through which all generated gases escape by the shortest and most natural path. The use of thin strips of lead or light grids and also the compounding of frames and separators reduces the weight, so that the battery has in addition an increase of efficiency as compared with the weight of material. Each strip being entirely inclosed in an insulating casing effectually prevents buckling of the strips and consequent short circuiting of two or more. The arrangement of bus bars provides for concentration of the full lines and equal distribution of current to all parts of each plate and to all plates, so that the efficiency of some parts of the battery is not limited by inefficiency of other parts. Furthermore, the battery produced is obviously of great mechanical strength and long life. The danger of sulfation is also reduced to a minimum, by reason of the equality of current density and perfect circulation and ventilation in all parts of the battery.

Having thus described my invention, what I claim is:—

1. In a storage battery unit, a frame comprising a plurality of longitudinal insulating members and a plurality of transverse insulating members connecting the longitudinal members, certain of said longitudinal members being wider than others, electrolyte passages formed in said wider longitudinal members, metallic conducting strips inserted in the channels between said longitudinal members, and a coating of active material on said strips.

2. In a storage battery unit an electrode frame comprising a plurality of longitudinal insulating members having transverse strip retaining bars said members being separated into groups by electrolyte circulation passages.

3. In a storage battery unit, an electrode frame comprising a plurality of longitudinal insulating members of different widths and electrolyte passages formed in the wider of said longitudinal insulating members.

4. In a storage battery unit, an electrode frame comprising a plurality of longitudinal insulating members of different widths, transverse insulating members connecting the longitudinal members and electrolyte passages formed in the wider of said longitudinal insulating members.

5. In a storage battery unit an electrode frame comprising a plurality of longitudinal members having transverse strip retaining bars of insulating material therebetween, some of said longitudinal members being wider than the others and electrolyte circulation passages in the wider of said members.

In witness whereof I have hereunto set my hand in the presence of two witnesses.

WILLIAM SCOTT HUTCHINSON.

Witnesses:
S. R. W. ALLEN,
G. M. MORELAND.